United States Patent [19]
Lin

[11] Patent Number: 5,197,789
[45] Date of Patent: Mar. 30, 1993

[54] CONNECTING STRUCTURE FOR A COMPUTER CASING

[76] Inventor: Chung H. Lin, 5F-23, 70, Fu-Shing Road, Taoyuan, Taiwan

[21] Appl. No.: 800,992

[22] Filed: Dec. 2, 1991

[51] Int. Cl.$^5$ .......................................... H05K 5/00
[52] U.S. Cl. .............................. 312/223.2; 312/265.5; 361/415
[58] Field of Search ................. 361/415, 380, 390; 312/257.1, 263, 265.5, 265.6, 223.2

[56] References Cited
U.S. PATENT DOCUMENTS
4,652,969  3/1987  Stegenga .................... 361/415 X

*Primary Examiner*—Peter R. Brown
*Attorney, Agent, or Firm*—Bacon & Thomas

[57] ABSTRACT

A computer casing connecting structure includes a base, an upper cover and a surface panel, each with corresponding structures for assembly together and fixed by only a bolt. The surface panel is designed with a plurality of seats for socket, switches and power source switch which are fixed by structures of the surface panel itself without use of any fastener. The base includes stepped edges in to position its front and back plate firmly and eliminate the possibility of deformation caused by external force.

5 Claims, 7 Drawing Sheets

CONNECTING STRUCTURE FOR A COMPUTER CASING

BACKGROUND OF THE INVENTION

Generally in assembling a computer casing, fasteners must be used for fixing of its surface panel, upper cover, base and other accessories. Such an assembly is time consuming, and insufficient tightness of fasteners would adversely affect the quality of finished products. Moreover, front and back side plates, on the base tend to be bent inwards or outwards upon application of external pressure, and hence a connecting board or strut is welded between them. It not only means additional labor, but also an obstacle to installation of the mother board. Hence, it is quite inconvenient to assemble a computer casing. In view of such defects, the inventor has created a structure of a computer casing which can have the base, upper cover and, surface panel assembled firmly with only a bolt, and without welding or other fasteners. The invention is characterized by:

(1) Installation of the surface panel and all switches, push buttons, sockets and other parts to the surface panel without fasteners of any nature (such as screw, adhesive, fastener, etc.).

(2) Use of only a bolt and internal connecting structure to fix the surface panel, base and upper cover together without welding or other fastening means.

(3) Forming of step edges by difference in time of pressing, which eventually eliminates the need for welding.

SUMMARY OF THE INVENTION

The main object of the present invention is to provide a connecting structure for computer casing which is assembled by including structures formed on a base, an upper cover, a surface panel and a bolt from the back of the upper cover to the base. The surface panel is formed with seats for switches, socket and push buttons to be fixed by the structure of the surface panel without any fasteners. The base is formed with stepped edges which are formed by difference in time of pressing and such stepped edges are designed to eliminate the need of reinforcing structure as used on the conventional base, and consequently the need of welding or other fasteners for assembly of the computer casing.

DETAILED DESCRIPTION OF THE PREFERRED EMBODIMENT

Figure 1:
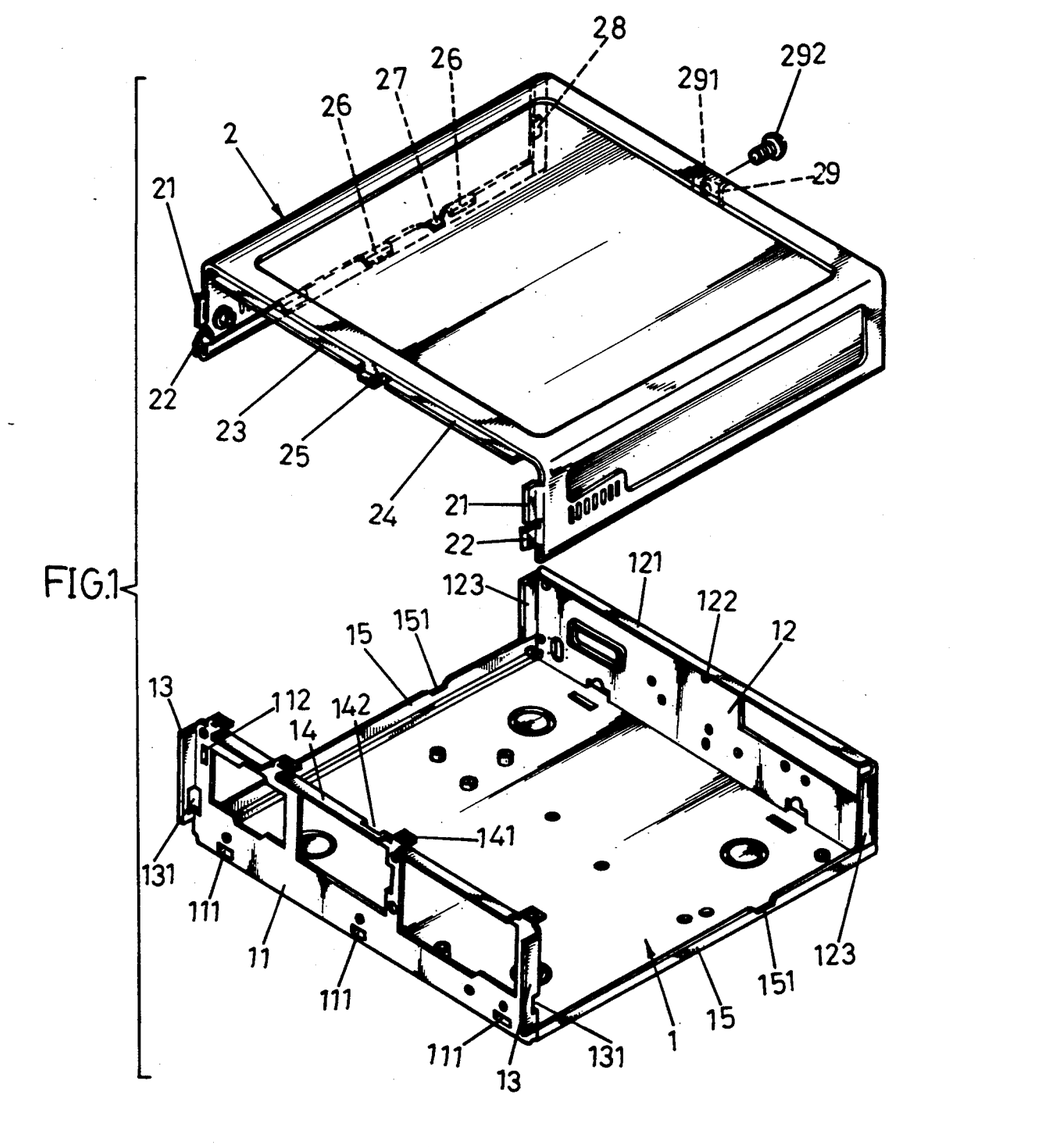
FIG. 1 is a fragmental view of a base and an upper cover according to the present invention.
Figure 2:
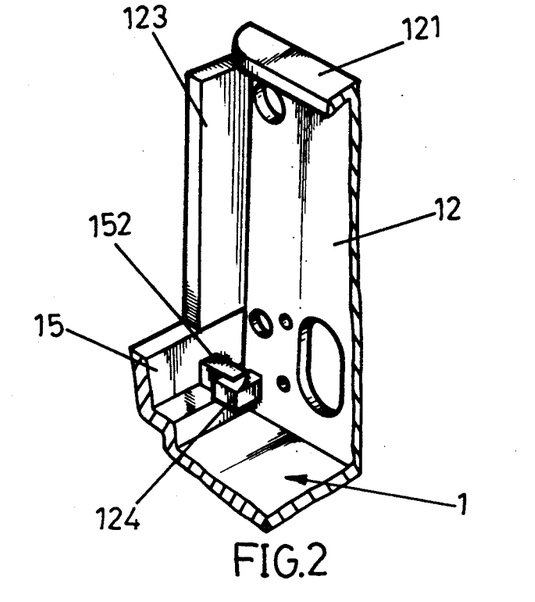
FIG. 2 illustrates connection of the front and back plates to step edges of the base according to the present invention.
Figure 3:
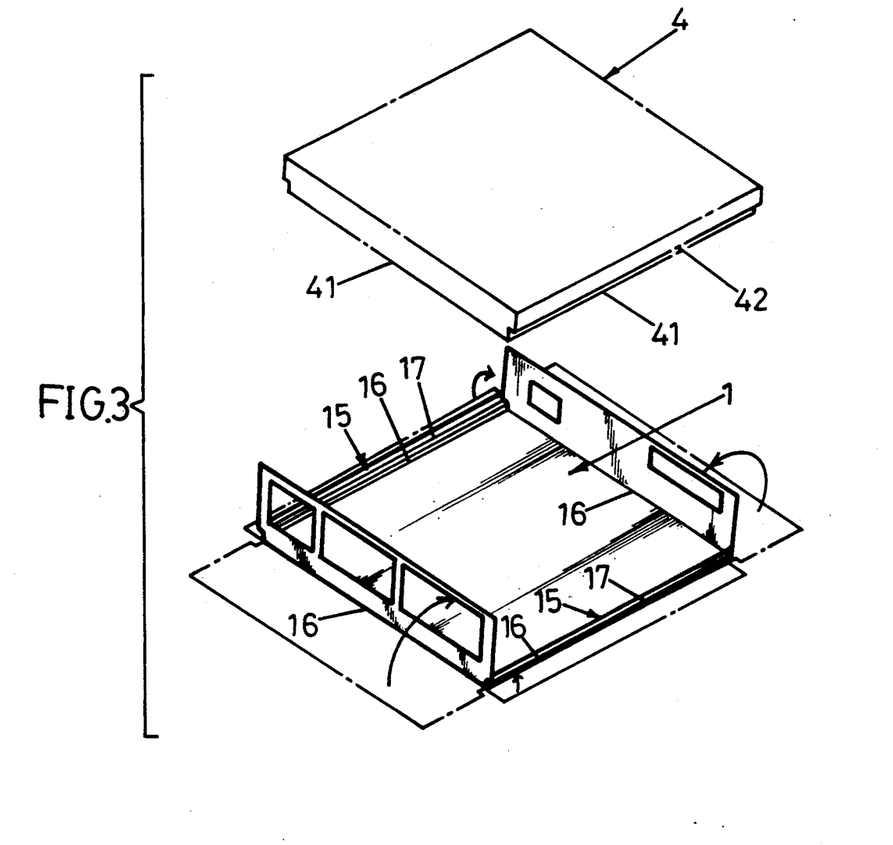
FIG. 3 illustrates forming of the front and back plates and the step edges of the base according to the present invention.

As shown in FIG. 1, the computer casing according to the present invention includes a base (1) having a front plate (11) and a back plate (12). The front plate (11) is formed with a side support (13) bent outwards at its left side, another side support (13) bent outwards at its right side, and an upper support (14) on its top. The back plate (12) is formed with a support (121) bent inwards on its top, a screw hole (122) at the middle, a stop element (123) bent inwards at the left side, and another stop element (123) bent inwards at the right side. The front plate (11) has a plurality of slots (111) at the bottom, a fixing hole (112) at the left side, and another fixing hole (112) at the right side. Each side support (13) has a fixing hole (131) at the lower end. On the upper support (14) there is a plurality of retaining elements (141) bent inwards at appropriate intervals, and an opening (142) in the middle. Each lateral side of the base (1) is bent to form a step element (15) on which a recess (151) is formed at an appropriate location. As shown in FIGS. 1 and 2, On each corners of the base (1), i.e., on each end of the step element (15), adjacent to the front plate (11) or the back plate (12), a hook (152) perpendicular to the step element (15) is formed. On each end of the front plate (11) and back plate (12), a block (124) corresponding to the hook (152) is formed. Engagement between each hook (152) and each block (124) is shown in FIG. 2. For making of such, as shown in FIG. 3, a base (1), a tooling (4) with a first step edge (41) and a second step edge (42) is used to form the base (1 by pressing so that a step edge (16) is formed first on each edge of the base (1) by the first step edge (41), and then another step edge (17) is formed on each of two opposite edges of the base (1) by the second step edge (42) so that two step elements (16) in the shape of a step are formed on two opposite edges of the base (1) in order to strengthen its structure, and to permit engaging of the hooks (152) at the left and right step elements (15) to the blocks (124) of the front and back plates (11 and 12) by difference in timing sequence for forming, and consequently the front and back plates (11 and 12) are retained and will not be pulled open by application of external force.

Figure 4:
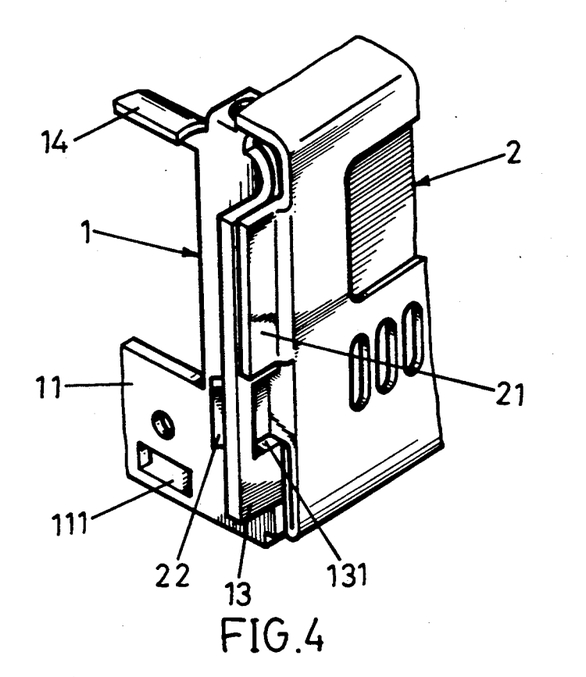
FIG. 4 illustrates connection of the side support and stop element on the upper cover to the base according to the present invention.
Figure 5:
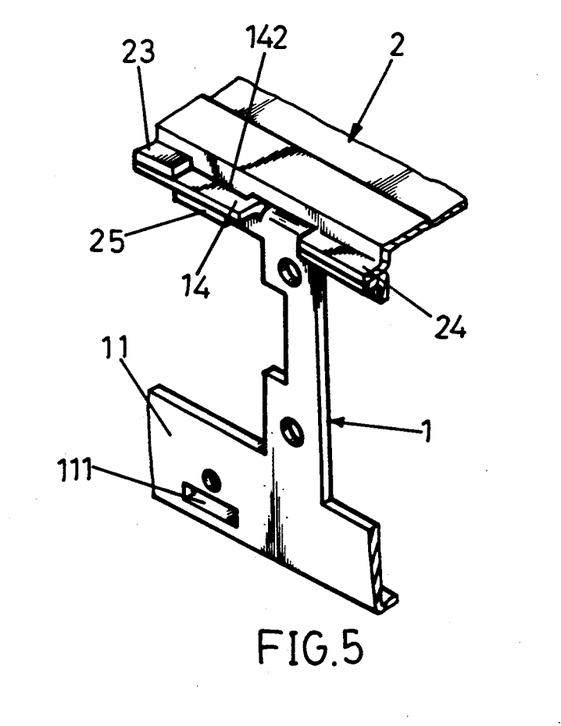
FIG. 5 illustrates connection of the stop element on the upper cover to the base according to the present invention.
Figure 6:
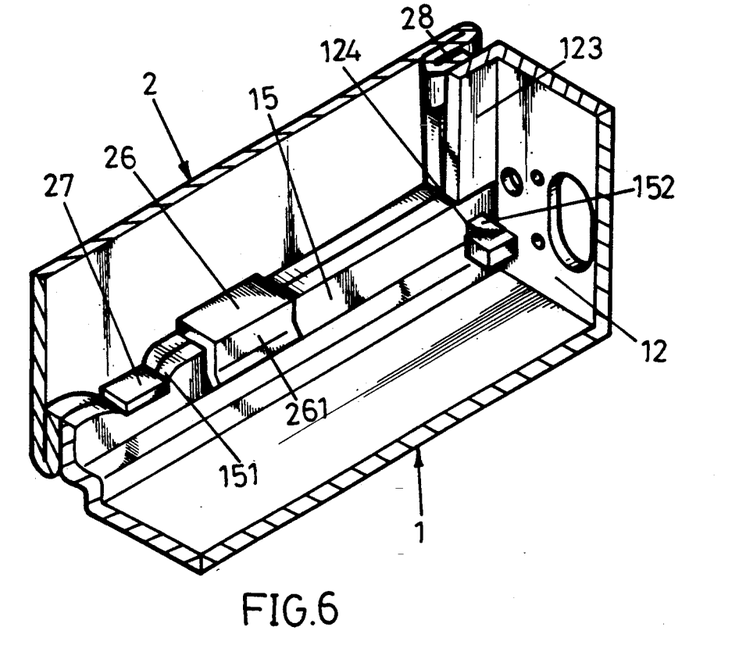
FIG. 6 illustrates connection of the block and stop element of the upper cover to the base according to the present invention.

As shown in FIG. 1, the present invention includes an upper cover (2) having a side support (21) with an inward recession and a stop element (22) at the front side of each lateral side, a left pushing element (23) and a right pushing element (24) on its top edge, and a stop element (25) in the middle of its top edge for fitting to the base (1). As shown in FIG. 4, each side support (21) at each lateral side of the upper cover (2) engage a side support (13) at each side of each base (1), and the stop element (22) engages a fixing hole (131) so that the upper cover (2) is fixed to the left and right front sides of the base (1). As shown in FIG. 5, the pushing elements (23 and 24) engage the upper support (14) of the base (1) while the stop element (25) in the middle is retained in the opening (142) of the upper support (14) so that the upper cover (2) is fixed to the upper front edge of the base (1). As shown in FIGS. 1 and 6, a plurality of equidistant retaining elements (26) are formed on the lower edge of each lateral side of the upper cover (2), and such lower edges are bent inwards. On each retaining element (26) an elastic curved plate (261) is extended downwards to the inner side of the upper cover (2), and a block (27) is formed at each lower edge of each lateral side of the upper cover (2) so that each lateral edge of the base (1) can be fixed to the upper cover (2) as shown in FIG. 6, in such a way that the retaining element (26) with the elastic curved plate (261) and the block (27) the engage step element (15) and the recession (151) on each edge of the base (1). In this way, the upper cover (2) is fixed to base (1), is prevented from extending laterally, and is capable of supporting a load thereon.

As shown in FIG. 1, a bent elastic tab (28) is formed at the rear end of each lateral side of the upper cover (2), and a seat (29) having a hole (291) is extended from the middle of the upper side of the upper cover (2) for fitting the back part of the upper cover (2) to the base (1). As shown in FIGS. 1 and 6, the elastic tabs (28) retain the back plate (12) to the side stop elements (123) elastically while the upper cover (2) is locked to the back plate (12) by means of a bolt (292) passing through the hole (291) to the screw hole (122) at the back plate (12). The upper cover (2) can be fixed to the base (1) by means of their respective structures and a bolt.

Figure 7:
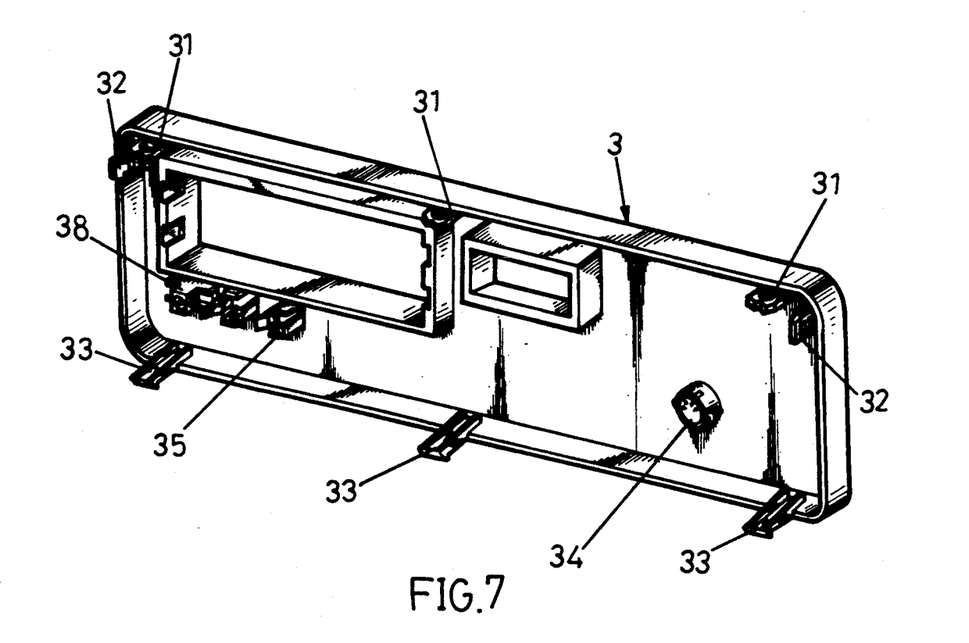
FIG. 7 is a perspective view of the surface panel according to the present invention.
Figure 8:
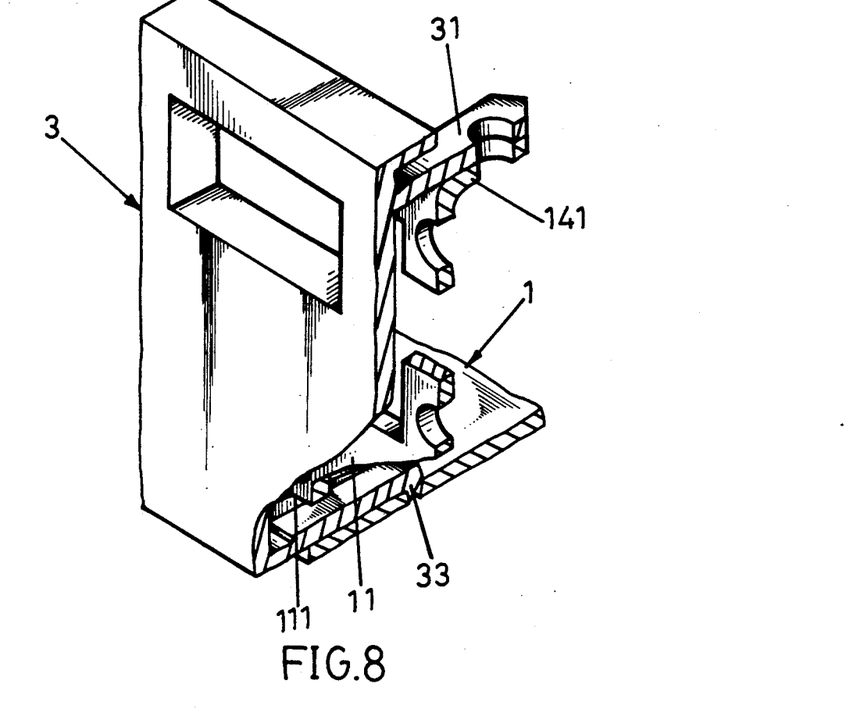
FIG. 8 illustrates connection of the fixing element and hook of the upper cover to the base according to the present invention.
Figure 9:
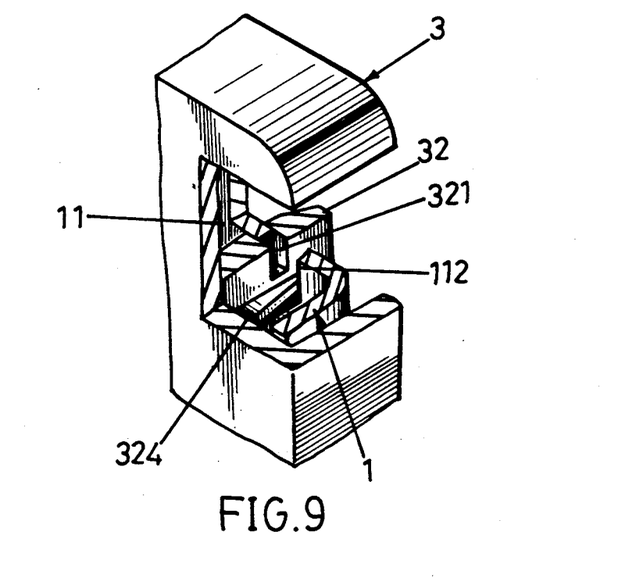
FIG. 9 illustrates connection of the fixing element of the surface panel to the base according to the present invention.
Figure 10:
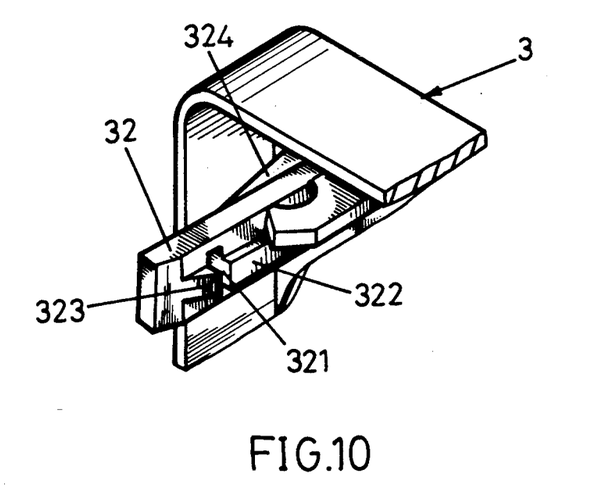
FIG. 10 illustrates the structure of the fixing element of the surface panel according to the present invention.

As shown in FIGS. 7, and 10 the present invention includes a surface panel (3). There is a plurality of connector elements (31) on the top portion of its back arranged in equal intervals, and a fixing element (32) on the top portion of each lateral side. A recess (321) is formed in the inner side of each fixing element (32). A plurality of hook elements (33) are formed on the lower portion of the back of the surface panel (3) in equal intervals. All these elements are designed to fix the surface panel (3) to the base (1). As shown in FIGS. 1 and 8, the connector elements (31) on the surface panel (3) can be retained by the respective retaining elements (141) of the upper support (14) of the base (1). As shown in FIG. 9, the fixing element (32) and the recession (321) at each lateral side of the surface panel (3) are positioned at the fixing hole (112) on the front plate (11) of the base (1). As shown in FIG. 8, each hook element (33) of surface panel (3) are retained by each slot (111) on the front plate (11) of the base (1). In the way described above, the surface panel (3) is fixed to the base (1) firmly without use of any bolt.

Figure 11:
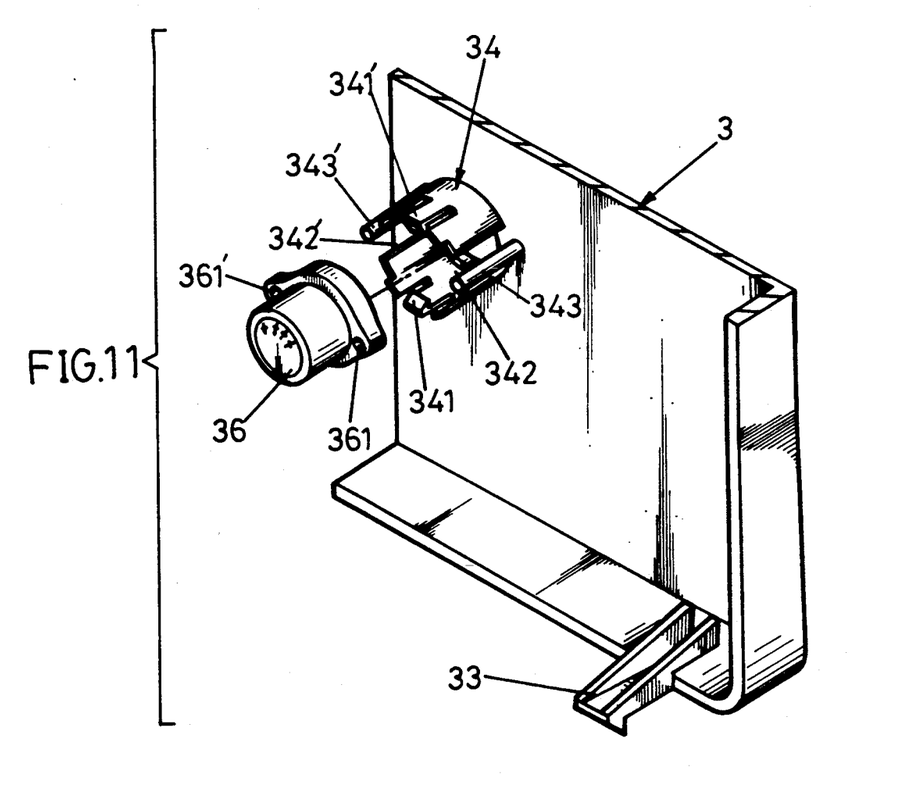
FIG. 11 illustrates the structure of the socket seat on the surface panel according to the present invention.
Figure 12:
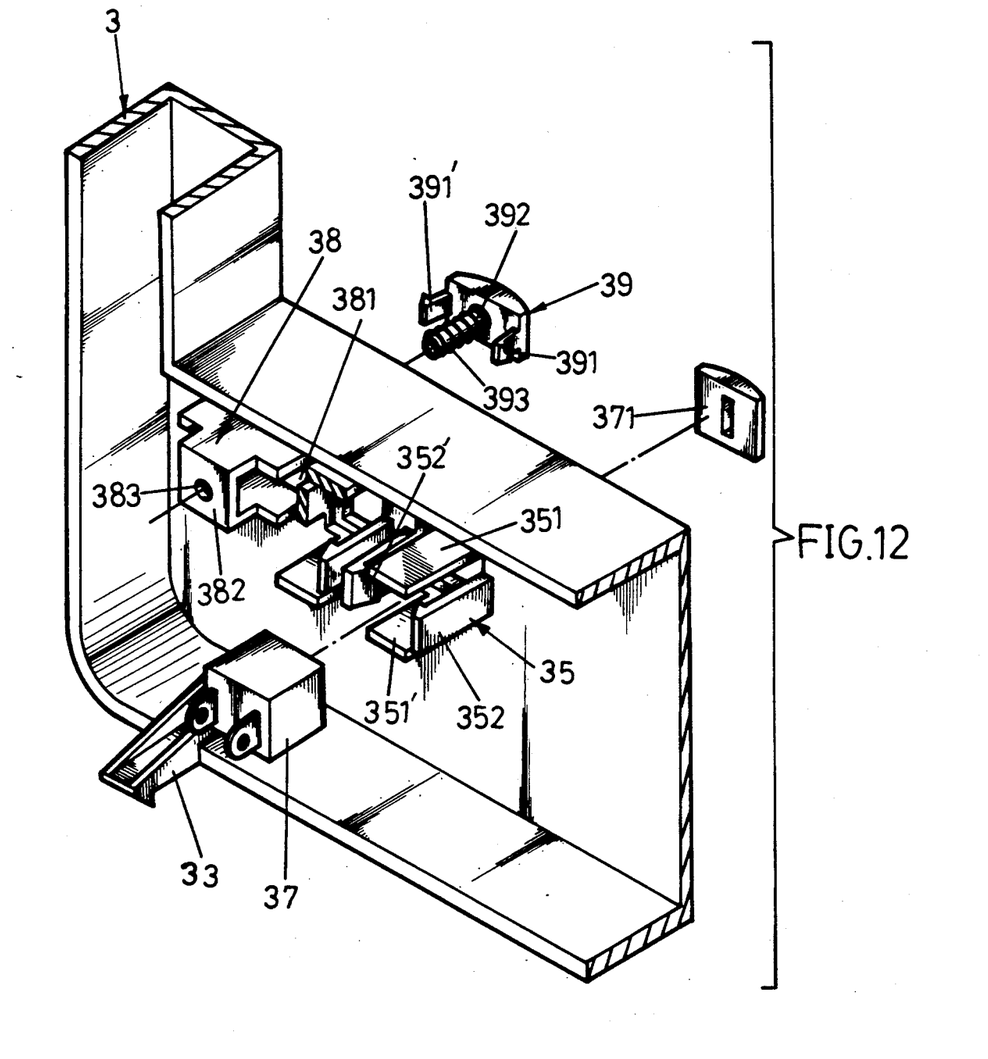
FIG. 12 illustrates the structure of the switch seat on the surface panel according to the present invention.

As shown in FIG. 7, a socket seat (34) and a plurality of switch seats (35) are formed on the surface panel (3) at appropriate positions. As shown in FIG. 11, hook members (341 and 341') are formed above and below the socket seat (34) respectively, while slots (342 and 342') and posts (343 and 343') are formed beside it so that a socket (36) with a hole (361 or 361') at each lateral side can be fixed by letting the holes (361 and 361') to pass the posts (343 and 343') and then the socket (36) to be seized by the hook members (341 and 341') without use of any screw. As shown in FIG. 12, top plates (351 and 351') are formed above and below each switch seat (35) while hook members (352 and 352') are formed beside it so that a switch (37) can be fixed to the switch seat (35) with the hook members (352 and 352') which retain the switch (37) in place, and the switch (37) can be operated with a push button (371) on the front side of the surface panel (3).

As shown in FIG. 7, a power switch seat (38) is formed on the surface panel (3). As shown in FIG. 12, the power switch seat (38) has a slot (381) at each lateral side, a connecting plate (382) on the back with a round hole (383) in the middle for incorporation with a push button (39) formed with a hook (391 or 391') at each lateral side and a post (392) surrounded by a spring (393) in the middle. The push button (39) with the spring (393) is inserted to the slots (381) from the front side of the surface panel (3) and positioned by the hooks (391 and 391') while the post (392) is within the round hole (383) so that by tension of the spring (393), the push button (39) can return to its original position after each pushing.

As shown in FIGS. 7, 9 and 10, the fixing element (32) at each lateral side of the surface panel (3) has a recess (321) with an edge (322) to withstand pressure applied by the fixing hole (112) of the front plate (11) on the base (1), and has a slant edge (323) to ease connecting to the fixing hole (112). Because the fixing element (32) is extended within the surface panel (3), a plurality of ribs (324) are formed thereon to prevent from breakage during assembly.

I claim:
1. A connecting structure for a computer casing comprising:
   A) a base including:
   1) a front plate having an outwardly bent side support at each of two front lateral sides, a first fixing hole at each lateral side, a second fixing hole positioned above each first fixing hole, an outwardly bent upper support with a hole in a middle portion and a plurality of spaced retaining elements, and a plurality of slots spaced along a bottom portion thereof,
   2) a back plate having an inwardly bent stop element at each of two back lateral sides, a hole in a middle portion, and an inwardly bent top support,
   3) a step element extending along each of two intermediate lateral sides, each step element having a recess formed therein;
   B) an upper cover including
   1) a side support and a stop element at each of two front lateral sides for engagement with the side supports and first fixing holes of the front plate,
   2) a pair of spaced pushing elements along a top front edge, and a stop element disposed between the pushing elements for engagement with the hole in the upper support of the front plate,
   3) a plurality of spaced retaining elements and a block along a lower edge of each of two intermediate lateral sides, each retaining element including an elastic curved plate for engagement with a step element of the base and the block being engageable within the recess of the step element,
   4) a bent elastic tab at each of two back lateral sides for engagement with the stop elements of the back plate,
   5) a hole in a back middle portion of the upper cover;
   C) a surface panel including:

1) a plurality of connector elements spaced along a top portion for engagement with the retaining elements of the front plate,
2) a fixing element on each of two lateral sides for engagement with the second fixing holes of the front plate,
3) a plurality of hook elements spaced along a bottom portion for engagement with the slots of the front plate; and D) a fastener engageable through the holes of the back plate and the upper cover.

2. The connecting structure of claim 1 wherein each fixing element of the surface panel includes a recess, a slant edge for facilitating engagement of the element with the second fixing hole, and at least one rib on a side opposite to the recess for reinforcing the element.

3. The connecting structure of claim 1 wherein the surface panel further includes at least one socket seat having upper and lower hook members a plurality of slots, and a plurality of posts for engaging a socket member.

4. The connecting structure of claim 1 wherein the surface panel further includes at least one switch seat having upper and lower plates and a plurality of hook members for engaging a switch member.

5. The connecting structure of claim 1 wherein the surface panel includes a power switch seat having a slot formed at each of two lateral sides thereof, a connecting plate at the back and a hole formed in a middle portion of the connecting plate for receiving a push button having a pair of hooks and a post surrounded by a spring.

* * * * *